Aug. 31, 1937.　　T. C. DELAVAL-CROW　　2,091,585
COASTER BRAKE
Filed April 21, 1936
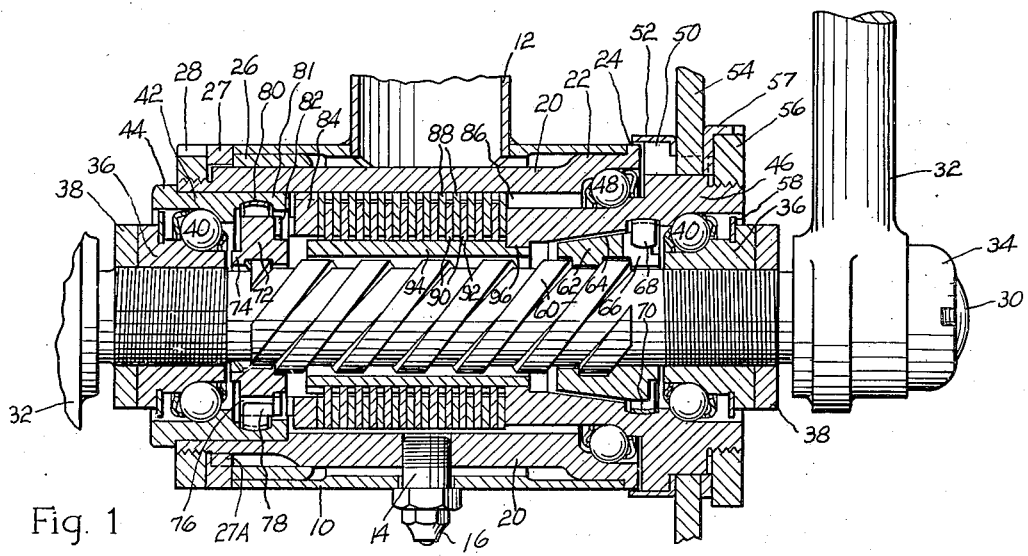
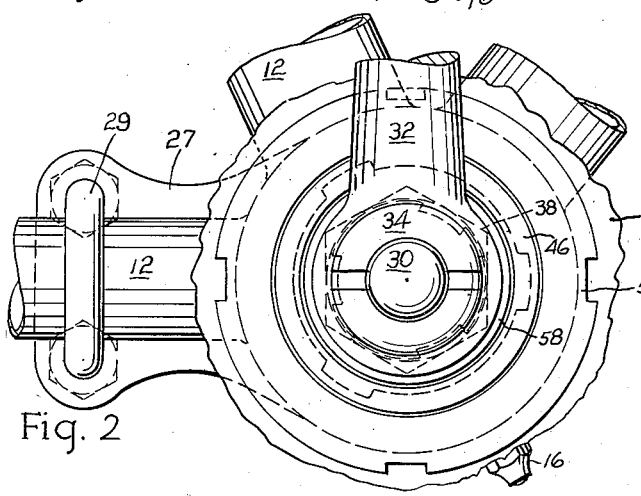
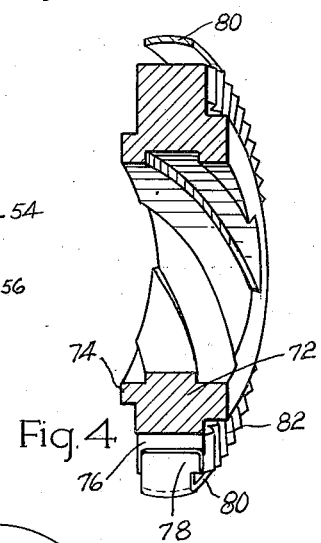
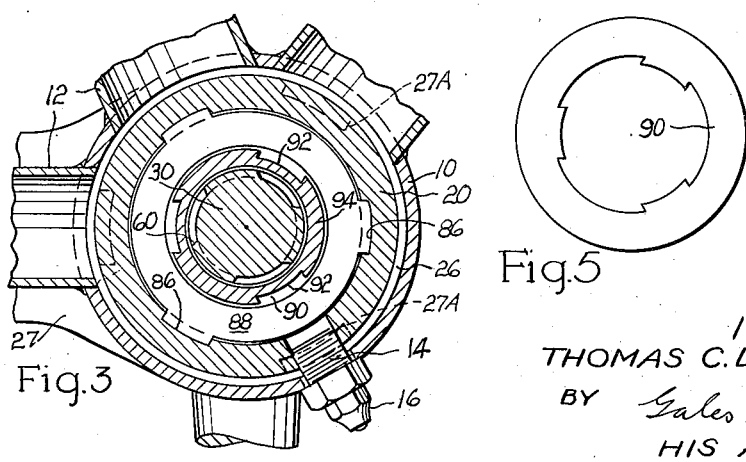
INVENTOR:
THOMAS C. DELAVAL-CROW,
BY Gales P. Moore
HIS ATTORNEY.

Patented Aug. 31, 1937

2,091,585

UNITED STATES PATENT OFFICE 2,091,585

COASTER BRAKE

Thomas C. Delaval-Crow, Bristol, Conn., assignor to General Motors Corporation, Detroit, Mich., a corporation of Delaware Application April 21, 1936, Serial No. 75,597

5 Claims. (Cl. 192—6)

This invention relates to coaster brakes and comprises all of the features of novelty herein disclosed. An object of the invention is to provide improved coaster brake mechanism especially of the crank hanger type. Another object is to provide a coaster brake mechanism of the crank hanger type with co-operating brake discs actuated by the pedal shaft. Another object is to provide a coaster brake mechanism wherein the driving and the braking elements are controlled by separate means actuated by the pedal shaft.

To these ends and also to improve generally upon devices of this character, the invention consists in the various matters hereinafter described and claimed. In its broader aspects, the invention is not necessarily limited to the specific construction selected for illustrative purposes in the accompanying drawing in which Fig. 1 is a sectional view taken axially.

Fig. 2 is a side elevation.

Fig. 3 is a cross section taken centrally of Fig. 1.

Fig. 4 is an enlarged broken away perspective view of a detail.

Fig. 5 is a side view of an inner brake disc.

The numeral 10 indicates the usual bicycle crank hanger into which the improved coaster brake and pedal shaft are assembled as a detachable unit. The usual tubular frame members 12 are secured in openings of the hanger 10. A hollow screw 14 having a grease fitting 16 is passed through the hanger and threaded in a brake housing 20. The housing has an enlargement 22 near one end to seat in the hanger and a flange 24 to engage one end of the hanger. At the other end, a bushing 26 is inserted between the housing and the hanger with an anchor plate 27 abutting against the bushing and the hanger, the anchor plate being secured to one of the frame members 12 by a strap 29. To prevent rotation of the housing 20, the anchor plate has a plurality of lugs 27A projecting into key slots in the housing. A nut 28 threaded on the housing and abutting against the anchor plate holds the housing and the coaster brake detachably in the hanger for removal as a unit therefrom.

A crank or pedal shaft 30 passes through the housing, its ends being provided with tapered and non-circular portions to receive pedal arms 32 which are detachably secured by nuts 34. Threaded inner race rings or bearing cones 36 are threaded on the shaft and clamped in adjusted positions by lock nuts 38. Rolling elements 40, preferably balls, run in raceway grooves of the bearing cones. At one end, the balls run also in a raceway groove of a bearing cup 42 which fits in the brake housing 20, the cup having an integral flange 44 to abut against the end of the brake housing. The cup 42 is preferably pressed into the housing and then brazed. At the other end, the balls 40 run in a raceway groove of a bearing cup or driving member 46 which is externally grooved to receive balls 48 which run in a raceway groove of the brake housing. The driving member 46 has a flange 50 projecting across the end of the brake housing, an angular dust washer 52 lapping across the joint. The hub of a sprocket wheel 54 is keyed on the driving member 46 against one leg of the dust washer 52 and is locked by a lock nut 56 and lock washer 57. Each bearing cone 36 carries a dust washer 58 which is pressed into a groove adjacent to a terminal flange which is externally polygonal to receive a wrench.

The pedal shaft 30 has steep threads 60 mating with threads in a shiftable nut 62 having an externally tapered clutch surface 64 adapted to have driving contact with a similar surface at the interior of the driving member 46. The nut has a radial kerf 66 at one end to receive a radial lug 68 on an arcuate lag spring or retarder 70. The nut and its retarder are similar to a second nut 72 and a retarder shown enlarged in Fig. 4. The retarder is arched in cross section and frictionally engages a rounded groove in the driving member 46. When the pedals are actuated to propel the bicycle forwardly, the retarding spring 70 resists the turning of the nut with the pedal shaft thereby causing the nut to shift into driving engagement with the driving member. Of course the sprocket wheel 54 will have the usual sprocket chain or other suitable connection with the rear wheel of the bicycle to drive it. When the pedals are held stationary to coast or are rotated backwards, the nut 62 will shift out of its frictional driving connection with the driving member 46.

Near the other end of the housing, a second shiftable nut 72 (Figs. 1 and 4) has threaded engagement with the threads 60. The nut has a little projection 74 to abut against the adjacent race ring 36 to limit shifting in one direction. The nut has a radial kerf 76 to receive a radially and laterally projecting lug 78 on an arcuate lag spring or retarder 80 which frictionally engages a rounded groove in an extension 81 of the bearing cup 42. When the bicycle is being propelled forwardly, the nut 72 and the spring 80 turn with the shaft 30, the only resistance being the friction of the spring in its groove.

The nut 72 has laterally facing clutch teeth 82 adapted to engage co-operating teeth on a clutch ring 84 which is provided with radial lugs or keys entering keyways 86 in the housing 20. Outer friction members or brake discs 88 are similarly keyed to the housing and alternate with inner friction members or brake discs 90 having radial lugs or keys entering keyways 92 in a brake sleeve 94. The outer brake discs are thus always anchored against rotation but clear the sleeve 94 which can turn with respect to them; the inner brake discs are free to turn with respect to the brake housing 20 but when the inner and the outer discs are squeezed together laterally, they frictionally resist turning of the sleeve 94 with respect to the brake housing and the hanger 10. The sleeve 94 is directly connected to the driving member 46 at 96 by keying and brazing and is in effect a part thereof.

In operation, in forward driving, the nut 62 shifts into driving engagement with the driving member 46 whereupon the pedal shaft, nut and driving member turn as a unit. When the pedal shaft is held stationary for coasting, the nut shifts away from the driving member 46 which turns with the sleeve 94 and the inner brake discs 90. When the pedal shaft is turned backwardly to apply the brake, the brake actuating nut 72 shifts to the right to come into clutching engagement with the clutch ring 84 and to force that clutch ring and the brake disc assembly to the right against the driving member 46. Thereupon resistance to the turning of the brake sleeve 94 and the driving member 46 (which are then being driven by the sprocket wheel and its connection with the rear wheel) is effected by reaction between the inner or rotating brake discs 90 and the anchored brake discs 88.

I claim:

1. In a device of the character described, a shaft and a housing mounted for relative rotation, a rotatable sleeve between the shaft and the housing, friction members between the housing and the rotatable sleeve, a pair of nuts having threaded connection with the shaft, one of said nuts being shiftable to bring the friction members into braking engagement and the other nut being adapted to have driving connection with the sleeve, and means for turning the shaft to shift said nuts; substantially as described.

2. In a device of the character described, a housing, a shaft journalled to rotate in the housing, a rotatable sleeve between the shaft and the housing, brake mechanism between the housing and the rotatable sleeve, a pair of nuts having threaded connection with the shaft, and means for turning the shaft in one direction to drive the sleeve and in the opposite direction to retard rotation of the sleeve with respect to the housing; substantially as described.

3. In a device of the character described, a housing, a shaft journalled to rotate in the housing, a rotatable sleeve between the shaft and the housing, brake mechanism between the housing and the rotatable sleeve, a nut threaded on the shaft and adapted to have driving connection with the sleeve, a second nut threaded on the shaft and adapted to have operative connection with the brake mechanism, and means for turning the shaft to shift said nuts; substantially as described.

4. In a device of the character described, a frame having a crank hanger with an opening, a housing adapted to slip into said opening, coaster brake mechanism carried in said housing, an anchoring member keyed to said housing, and means for securing the anchoring member to the frame; substantially as described.

5. In a device of the character described, a crank hanger, a shaft rotatable in the hanger, a rotatable driving member mounted for unlimited rotation with respect to the shaft for coasting, means for causing the shaft to have driving connection with the driving member, rotatable brake discs connected to the driving member, a series of co-operating brake discs held from rotation with respect to the hanger, and means for causing the shaft to bring the brake discs into braking engagement; substantially described.

THOMAS C. DELAVAL-CROW.